United States Patent [19]

Kouno et al.

[11] Patent Number: 4,702,725
[45] Date of Patent: Oct. 27, 1987

[54] HYDRAULIC CONTROL SYSTEM FOR CONTINUOUSLY VARIABLE TRANSMISSION

[75] Inventors: Katsumi Kouno, Susono; Daisaku Sawada, Gotenba, both of Japan

[73] Assignee: Toyota Jidosha Kabushiki Kaisha, Aichi, Japan

[21] Appl. No.: 843,237

[22] Filed: Mar. 24, 1986

[30] Foreign Application Priority Data

Mar. 26, 1985 [JP] Japan .................................. 60-62871

[51] Int. Cl.$^4$ ............................................. F16H 11/06
[52] U.S. Cl. .......................................... 474/28; 474/18
[58] Field of Search ...................... 474/28, 69, 70, 11, 474/12, 18; 74/864, 868, 869

[56] References Cited

U.S. PATENT DOCUMENTS

| | | | |
|---|---|---|---|
| 4,094,203 | 6/1978 | van Deursen et al. | 474/28 |
| 4,161,894 | 7/1979 | Giacosa | 474/28 X |
| 4,369,675 | 1/1983 | van Deursen | 474/18 X |
| 4,462,275 | 7/1984 | Mohl et al. | 474/12 X |
| 4,475,416 | 10/1984 | Underwood | 74/868 |
| 4,601,680 | 7/1986 | Tokoro et al. | 474/28 X |

Primary Examiner—George A. Suchfield
Attorney, Agent, or Firm—Parkhurst & Oliff

[57] ABSTRACT

A hydraulic control system for a continuously variable transmission which has an input and an output variable-diameter pulley, a belt connecting the input and output pulleys, and a pair of cylinders for changing effective diameters of the pulleys. The control system includes a hydraulic source to supply a pressurized fluid for applying first and second line pressure to one and the other of the cylinders via a first and a second line, respectively. The control system comprises: a first regulator, connected to the first line, for regulating the first line pressure to be applied to the one cylinder, and thereby controlling a tension of the belt; a flow control device, disposed in the second line, for controlling flows of the fluid into and from the other cylinder, for controlling a speed ratio of the transmission; a second regulator, disposed between the hydraulic source and the first regulator, for controlling a rate of relief flow of the fluid therethrough from the second line into the first line, and thereby regulating the second line pressure which is higher than the first line pressure; and a controller for controlling the second regulator to regulate the second line pressure according to a predetermined condition.

6 Claims, 7 Drawing Figures

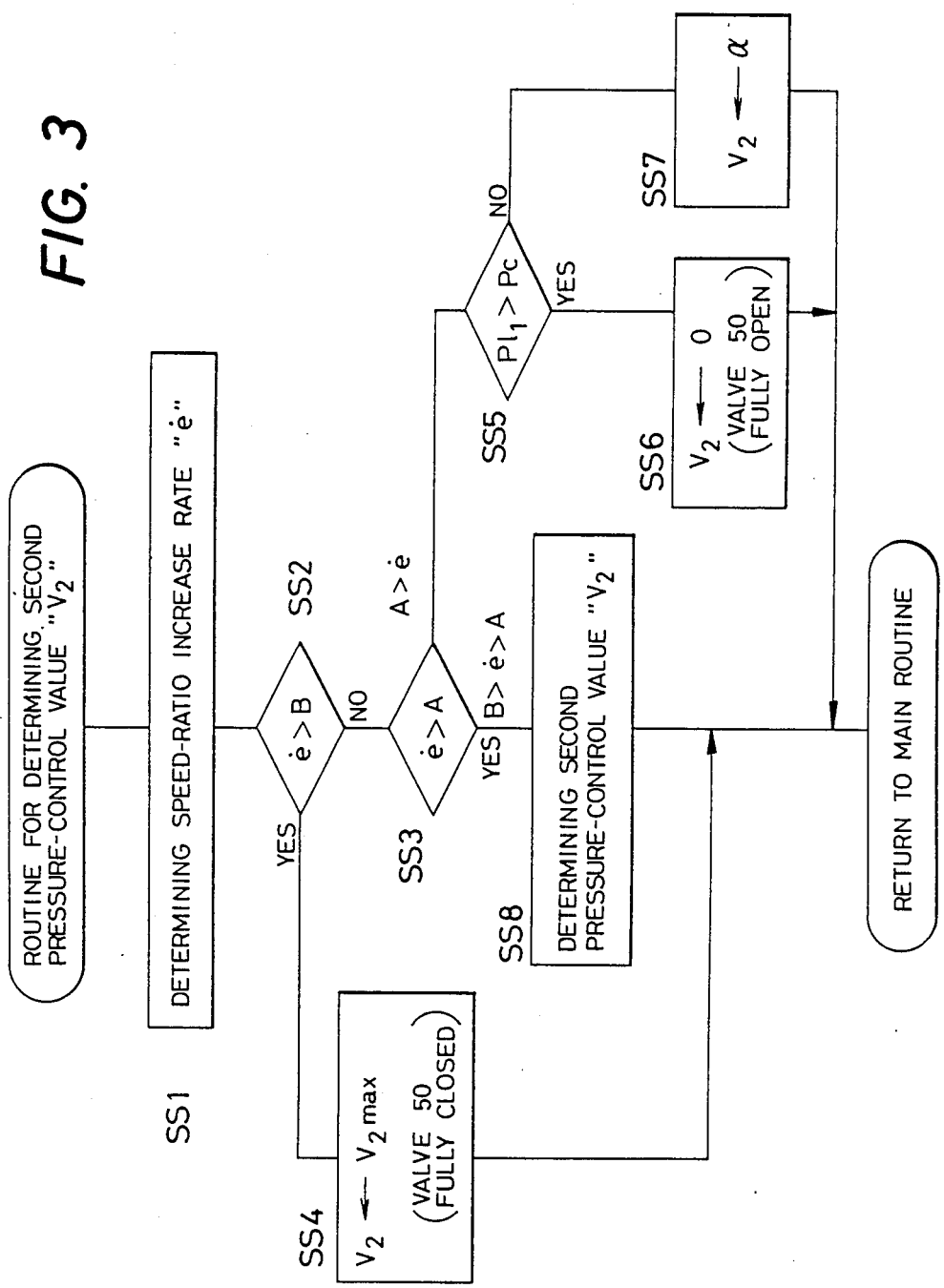

HYDRAULIC CONTROL SYSTEM FOR CONTINUOUSLY VARIABLE TRANSMISSION

BACKGROUND OF THE INVENTION

1. Field of the Invention

The present invention relates generally to a hydraulic control device for a continuously variable transmission of a belt-and-pulley type, and more particularly to techniques for avoiding an unnecessary rise in fluid pressure in a hydraulic circuit for operating the transmission, thereby minimizing power loss.

2. Related Art Statement

A continuously variable transmission of a belt-and-pulley type, comprising an input and an output variable-diameter pulley provided on an input or drive shaft and an output or driven shaft, respectively; a transmission belt connecting the input and output variable-diameter pulleys; and two hydraulic cylinders to change effective diameters of the input and output pulleys is known. In such a continuously variable transmission, a ratio of a thrust of the output-side hydraulic cylinder to that of the input-side hydraulic cylinder must be changed over a relatively wide range, for example from 1.5 to 0.5, in order to change a speed ratio of the transmission to change output speeds over a wide range.

For such a continuously variable transmission, a hydraulic control system is known, wherein first and second line pressures are controlled by first and second pressure regulating valves, respectively. The first line pressure is lower than the second line pressure and is applied to the output-side hydraulic cylinder, primarily for controlling a tension of the transmission belt. The comparatively high second line pressure is applied to a flow control valve which controls the flow of hydraulic fluid to and from the input-side hydraulic cylinder, thereby changing the speed ratio of the transmission. In this type of hydraulic control system, a difference between the first and second line pressures assures a relatively large difference in thrust between the two cylinders, even if the two cylinders have substantially the same pressure receiving areas. An example of such hydraulic control system is disclosed in Japanese Patent Application which was published in 1973 under Publication No. 48-26692 for opposition purposes.

PROBLEM SOLVED BY THE INVENTION

In the known continuously variable transmission hydraulic control system discussed above, it is not necessary to maintain the second line pressure at a level higher than the first line pressure when the thrust of the input-side hydraulic cylinder established by the flow control valve is less than the thrust of the output-side hydraulic cylinder. Specifically, while the thrust ratio is larger than 1, the maintenance of the second line pressure higher than the first line pressure causes an unnecessarily high load to be exerted on an oil pump of the hydraulic system, resulting in a power loss of a drive for the oil pump.

SUMMARY OF THE INVENTION

It is accordingly an object of the present invention to provide an improved hydraulic control system for a continuously variable transmission which is operable with minimum power consumption, while permitting a satisfactory control of the speed ratio of the transmission over a wide range.

According to the present invention, there is provided a hydraulic control system for a continuously variable transmission which has an input and an output variable diameter pulley provided on an input and an output shaft, respectively. A transmission belt connects the input and output pulleys to transmit power from the input pulley to the output pulleys to transmit power from the input pulley to the output pulley and a pair of hydraulic cylinders changes the effective diameters of the pulleys engaging the belt. The hydraulic control system includes a hydraulic source to supply a pressurized fluid to one and the other of the hydraulic cylinders via a first and a second pressure line, comprising: (a) a first pressure regulating device connected to the first pressure line for regulating the first line pressure to be applied to one hydraulic cylinder, thereby controlling a tension of the transmission belt; (b) a flow control device disposed in the second pressure line for controlling the flow of fluid from the second pressure line into the other hydraulic cylinder and the flow of fluid discharged from the other hydraulic cylinder, thereby controlling a speed ratio of the transmission; (c) a second pressure regulating device, disposed between the hydraulic source and the first pressure regulating device, for controlling a rate of relief flow of the fluid therethrough from the second pressure line toward the first pressure regulating device, thereby regulating the pressure differential between the first and second line pressures inversely proportional to the rate of relief flow of the fluid; and (d) a device for controlling the second pressure regulating device to regulate the second line pressure according to a predetermined condition.

In the hydraulic control device of the present invention, the second line pressure to be supplied to the flow control device is controlled by the control device according to a predetermined condition, such that the second line pressure is at a minimum level required to permit the variable transmission to operate in a suitable manner under the specific condition. Hence, the instant arrangement is effective to avoid an unnecessary rise in the second line pressure and the resultant loss of power in the hydraulic source.

According to one advantageous embodiment of the invention, the control device maximizes the rate of relief flow of the fluid through the second pressure regulating device, so as to zero the pressure differential while the speed ratio of the transmission is constant or reduced. In other words, the second pressure regulating device is brought into its fully open position, thereby rendering the the second line pressure equal to the first line pressure. Further, while the speed ratio is increased, the control device controls the rate of relief flow to control the pressure differential based on a rate of increase in the speed ratio.

According to another preferred embodiment of the invention, the control device controls the rate of relief flow of the fluid through the second pressure regulating device, so as to increase the pressure differential by decreasing the speed ratio. It may also increase the rate of increase of the speed ratio, when the rate of increase of the speed ratio falls within a predetermined normal range.

According to another preferred embodiment of the invention, while the rate of increase of the speed ratio is lower than a predetermined level, the control device controls the rate of relief flow of the fluid through the second pressure regulating device, so as to zero the pressure differential when the first line pressure is higher than the pressure in the other hydraulic cylinder and so as to set the pressure differential at a predetermined minimum value required to increase the speed ratio when the first line pressure is lower than or equal to the pressure in the other hydraulic cylinder.

According to a further preferred embodiment of the invention, the control device minimizes the rate of relief flow of the fluid through the second pressure regulating device, so as to maximize the pressure differential while the rate of increase in the speed ratio is higher than a predetermined level. In other words, the second pressure regulating device is brought into its fully closed position so that the speed ratio may be increased at a higher rate.

BRIEF DESCRIPTION OF THE DRAWINGS

The objects, features and advantages of this invention will become more apparent from reading the following detailed description of a preferred embodiment of the invention, when considered in conjunction with the accompanying drawings, in which:

FIGS. 2 and 3 are flow charts illustrating the operation of the hydraulic control system of FIG. 1;

DETAILED DESCRIPTION OF THE PREFERRED EMBODIMENT

To further clarify the concept of the present invention, a preferred embodiment of the invention will be described in detail, referring to the accompanying drawings.

Figure 1:
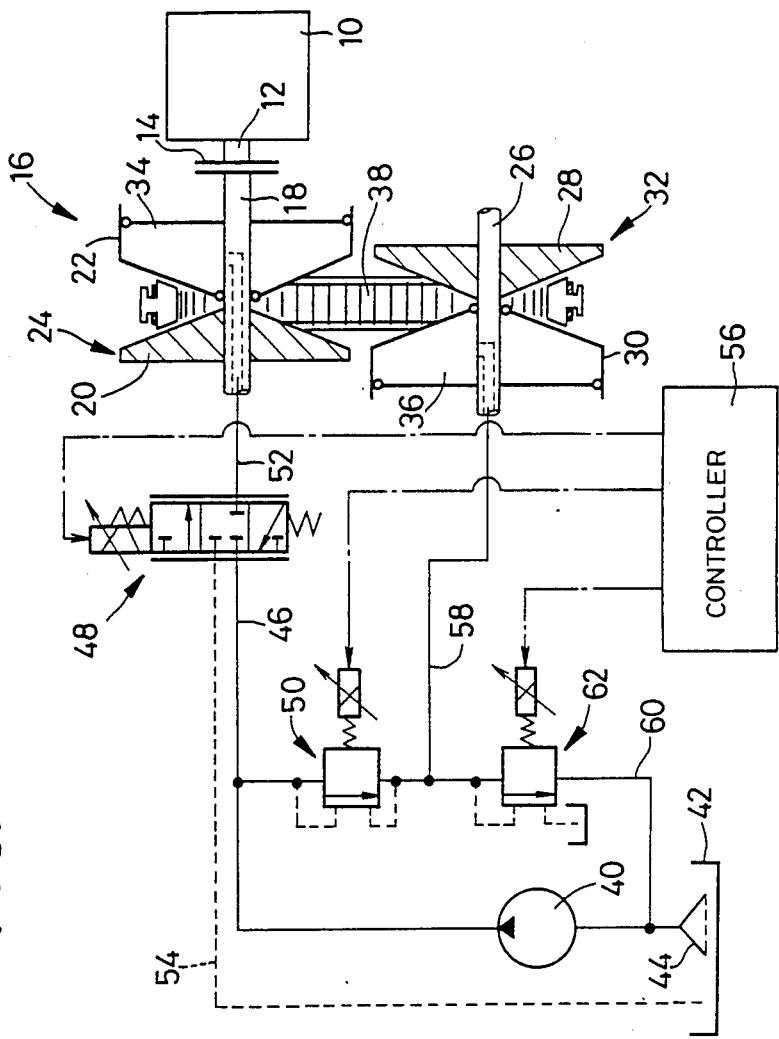
FIG. 1 is a schematic hydraulic circuit diagram of one embodiment of a hydraulic control system for operating a continuously variable transmission.

Referring first to FIG. 1, there is shown a schematic diagram of a hydraulic control system constructed according to the invention. In the figure, reference numeral 10 designates an engine of an automotive vehicle. A crankshaft 12 of the engine 10 is connected to an input shaft 18 of a continuously variable transmission 16 of a belt-and-pulley type (hereinafter abbreviated as "CVT"), via a clutch 14 such as an electromagnetic or centrifugal clutch, or a fluid coupling. The input shaft 18 is provided with a stationary rotor 20 fixed thereto, and an axially movable rotor 22. The rotor 22 is movable on the input shaft 18 in the axial direction, but not rotatable relative to the input shaft 18. The stationary and movable rotors 20, 22 cooperate to constitute a variable-diameter input pulley 24 having a V-groove of variable width. Namely, the input pulley 24 is adapted such that its effective diameter engaging a transmission belt 38 is variable. The CVT 16 further has an output shaft 26 which has a stationary rotor 28 fixed thereto, and an axially movable rotor 30. These rotors 28, 30 cooperate to constitute a variable-diameter output pulley 32. The movable rotor 22 of the input pulley 24 is moved axially relative to the input shaft 18 by an input-side hydraulic cylinder 34, while the movable rotor 30 of the output pulley 32 is moved axially relative to the output shaft 26 by an output hydraulic cylinder 36. The input and output hydraulic cylinders 34, 36 have substantially the same pressure-receiving areas, and the input and output pulleys 24 and 32 have substantially the same diameter. The input and output pulleys 24, 32 are connected by a transmission belt 38 which is made up of an endless loop of successive blocks which are supported by and arranged along a hoop. Rotation of the engine 10 is transmitted to the input shaft 18 and imparted to the output shaft 26 through the transmission belt 38, from which it is transmitted to drive wheels of the vehicle via an auxiliary transmission and a final reduction gear unit, both of which are not shown.

As a hydraulic source for the input and output hydraulic cylinders 34, 36, there is provided a pump 40 which is operatively connected to the crankshaft 12 through a connection rod (not shown) which extends through the input shaft 18 of the CVT 16, whereby the pump 40 is driven by the engine 10. The pump 40 pumps a working fluid from an oil reservoir 42 through a strainer 44 and delivers the pressurized fluid to a solenoid-operated flow control servo valve 48 and to a solenoid-operated second pressure control servo valve 50 through a second pressure line 46. The flow control servo valve 48 is a three-way valve which is connected to the input hydraulic cylinder 34 through a line 52, and to the reservoir 42 through a drain line 54. Thus, the flow control servo valve 48 is designed to control the flow of working fluid from the second pressure line 46 into the input hydraulic cylinder 34 and the flow of the fluid from the hydraulic cylinder 34 back into the reservoir 42. The flow control servo valve 48 is operated in response to a drive signal from a controller 56 to change the effective diameter of the input-side pulley 24, whereby a speed ratio "e" of the CVT 16, that is, the ratio of the speed of the output shaft 26 to that of the input shaft 18, is adjusted. In this embodiment, the flow control servo valve 48 constitutes a flow control device, while the drain conduit 54 constitutes a drain line.

The second pressure control servo valve 50 is connected to a solenoid-operated first pressure control servo valve 62 and to the output cylinder 36 via a first pressure line 58. The first pressure control servo valve 62 is connected to the reservoir 42 via the return line 60, and is operated in response to a drive signal from the controller 56 to control the flow of fluid from the first pressure line 58 into the reservoir 42. Thus, the first pressure control servo valve 62 serves as a first pressure regulating device for controlling a first line pressure Pl1 in the first pressure line 58 leading to the output-side cylinder 36. Similarly, the second pressure control servo valve 50 is operated in response to a drive signal from the controller 56, to control the relief flow of fluid from the second pressure line 46 into the first pressure line 58 toward the first pressure control servo valve 62. Thus, the second pressure control servo valve 50 functions as a second pressure regulating device for controlling a second line pressure Pl2 in the second pressure line 46.

The controller 56 is comprised of a central processing unit (CPU), a read-only memory (ROM) and a random-access memory (RAM). As indicated above, the controller 56 serves as means for controlling the operations of the flow control servo valve 48 and the second and first pressure control servo valves 50, 62. More specifically, the controller 56 processes various input signals, namely a THROTTLE signal, an INPUT SPEED signal and an OUTPUT SPEED signal, by utilizing the control programs of FIGS. 2 and 3 stored in the ROM and a temporary data storage function of the RAM. As a result, the controller 56 applies controlled drive signals to the servo valves 48, 50, 62 in order to control the fluid flow to and from the input-side cylinder 34, and the second and first line pressures Pl2 and Pl1 in the second and first pressure lines 46, 58.

The THROTTLE signal is generated from a throttle sensor (not shown) which detects an opening angle "$\theta$TH" of a throttle valve of the engine 10. The INPUT SPEED signal is generated from an input speed sensor (not shown) which detects a rotating speed of the input shaft 18 of the CVT 16. The OUTPUT SPEED signal is generated from an output speed sensor (not shown) which detects a rotating speed of the output shaft 26 of the CVT 16. The rotating speeds of the input and output shafts 18, 26 of the CVT 16 are hereinafter referred to as an input speed "Nin" and an output speed "Nout" of the CVT 16, respectively.

Referring next to flow charts of FIGS. 2 and 3, the operation of the present hydraulic control system will be described.

Figure 2:
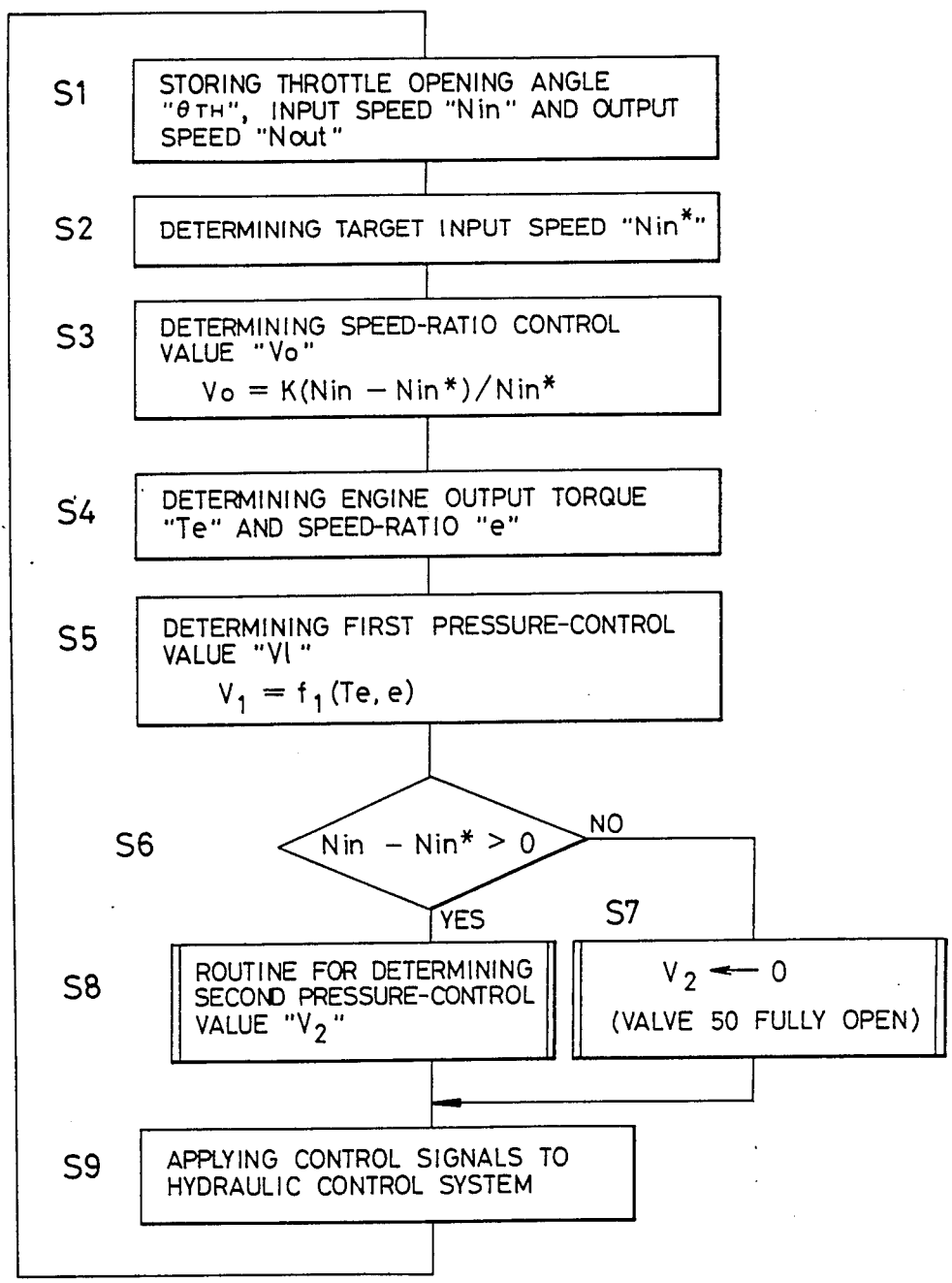

Initially, the controller 56 executes step S1 of FIG. 2 to store in the RAM the throttle opening angle "$\theta$TH" of the THROTTLE signal and the input and output speeds "Nin" and "Nout" of the INPUT SPEED and OUTPUT SPEED signals. Step S1 is followed by step S2 to determine a target engine input speed "Nin*" of the input shaft 18 based on the throttle opening angle "$\theta$TH" and a running speed "v" of the vehicle, according to a predetermined relation between these variables. This relation is determined so that a currently required output of the engine 10 is obtained with a minimum fuel consumption. The relation is stored as a function of a data map in the RAM of the controller 56. The vehicle speed "v" is calculated by multiplying the output speed "Nout" of the output shaft 18, by a gear ratio of a power transmission system between the output shaft 18 of the CVT 16 and the drive wheels of the vehicle.

Subsequently, the controller 56 goes to step S3 in which a speed-ratio control value "Vo" for controlling a speed ratio "e" of the CVT 16 is determined according to a predetermined formula, such that the target engine speed "Nin*" coincides with the actual engine speed "Nin", determined by the speed of the input shaft 18. The following equation (1) is used to determine the speed-ratio control value "Vo":

$$Vo = K(Nin - Nin^*)/Nin^* \quad (1)$$

where, K: Control constant This speed-ratio control value "Vo" is a voltage of a drive signal to be applied from the controller 56 to the flow control servo valve 48.

Next, the controller 56 executes step S4 to determine an actual output torque "Te" of the engine 10 and the speed ratio "e" of the CVT 16. The output torque "Te" is calculated based on the throttle opening angle "$\theta$TH" and the actual engine speed "Nin" of the engine 10, according to a relation between these variables. Alternatively, a suitable torque sensor may be used to directly detect the actual output torque "Te" of the engine 10. The speed ratio "e" of the CVT 16 is obtained by dividing the output speed "Nout" of the output shaft 26 by the input speed "Nin" of the input shaft 18.

Step S4 is followed by step S5 in which a first line pressure Pl1, via the first pressure control servo valve 62, is determined according to the following equation (2):

$$V1 = f_1(Te, e) \quad (2)$$

The above function is determined so as to obtain a required minimum value of the first line pressure Pl1 assuring a normal operation of the CVT 16 without slippage of the transmission belt 38 on the input and output pulleys 24, 32, as is well known in the art. For example, the value "V1" is obtained from the following equations (3), (4) and (5).

$$V1 = C \cdot Pl1 \quad (3)$$

$$Pl1 = W/A \quad (4)$$

$$W = C1 \times \frac{e+1}{e\left\{1 - C2\left(\frac{e-1}{e+1}\right)^2\right\}} \times Te \quad (5)$$

where,
W: Thrust of hydraulic cylinder 36
A: Pressure-receiving area of hydraulic cylinder 36
C1, C2: constants The first pressure-control value "V1" is a voltage of the drive signal to be applied by the controller 56 to the first pressure control servo valve 62. The voltage of this drive signal determines a control or relief pressure of the first pressure control servo valve 62.

The controller 56 then goes to step S6 to check if the actual input speed "Nin" is higher than the target input speed "Nin*". If the actual input speed "Nin" is not higher than the target input speed "Nin*", the controller 56 goes to step S7 in which a second pressure-control value "V2", controlling the second line pressure Pl2 via the the second pressure control servo valve 50, is zeroed. Specifically, when the actual input speed "Nin" is not higher than the target input speed "Nin*", the CVT 16 is placed either in a condition in which no pressurized fluid in the second pressure line 46 is flowing into the first hydraulic cylinder 34 thereby maintaining the speed ratio "c" of the CVT 16, or in a condition in which the fluid in the first hydraulic cylinder 34 is discharged through the drain conduit 54 thereby reducing the speed ratio "e" to increase the input speed "Nin" up to the target input speed "Nin*". The speed ratio "c" is controlled by the flow control servo valve 48, according to the speed-ratio control value "Vo" determined in step S3, such that the actual engine speed "Nin" coincides with the target engine speed "Nin*". In these conditions, it is not necessary to maintain the second line pressure Pl2 at a level higher than the first line pressure Pl1. For this reason in step S7, the second pressure-control value "V2" controlling the second line pressure Pl2 is zeroed, fully opening the second pressure control servo valve 50, thereby maximizing the rate of relief flow of the fluid through the second pressure control servo valve 50 from the second pressure line 46 into the first pressure line 58. As a result, the second line pressure Pl2 is made equal to the first line pressure Pl1.

When step S6 reveals that the actual input speed "Nin" is higher than the target input speed "Nin*", the controller 56 goes to step S8 to execute a routine in which the second pressure-control value "V2" is determined so as to increase the speed ratio "e" of the CVT 16 and thereby lower the actual engine speed "Nin" down to the target engine speed "Nin*". The second pressure-control value "V2"for the second pressure control servo valve 50, corresponds to a pressure differential "ΔP" equal to the amount by which the second line pressure Pl2 is higher than the first line pressure Pl1. In other words, the pressure differential "ΔP" is varied as a function of the second pressure-control value "V2" and is inversely proportional to the rate of relief flow of the fluid through the second pressure control servo valve 50.

Step S7 or S8 is followed by step S9 wherein the drive signals whose voltages correspond to the control values "Vo", "V1" and "V2" are fed from the controller 56 to the flow control servo valve 48, first pressure control servo valve 62 and second pressure control servo valve 50, respectively, thereby controlling the speed ratio "e" of the CVT 16, first line pressure Pl1 and second line pressure Pl2, respectively. Specifically, the controller 56 applies to the first pressure control servo valve 62 a drive signal whose voltage is controlled so as to meet the actual speed ratio "e" of the CVT 16 and an actual torque which is transmitted by the CVT 16, whereby the first line pressure Pl1 is regulated by the first pressure control servo valve 62 so that the first line pressure Pl1 is held at a minimum level necessary to avoid slippage of the belt 38. The first line pressure Pl1 is regulated as indicated in FIG. 6, giving a minimum but sufficient tension to the belt 38 to cause a pressure buildup "Pc" in the input-side cylinder 34 corresponding to the speed ratio "e" and transmission torque of the CVT 16.

Figure 4:
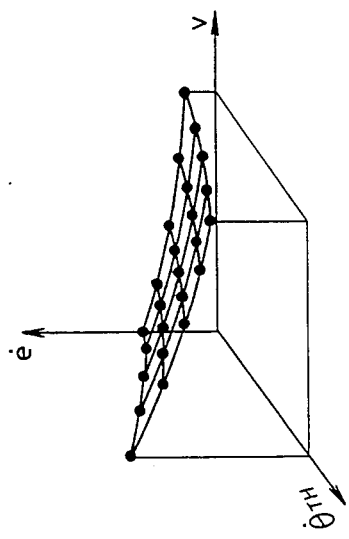

FIG. 3 illustrates an example of step S8 for determining the second pressure-control value "V2". In this routine, the controller 56 initially executes step SS1 to determine a rate of increase "ė" in the speed ratio "e" of the CVT 16. This rate "ė" is determined based on the rate of increase of the throttle opening angle "θTH", and the vehicle speed "v", according to a predetermined relation between these variables. The rate of increase of the throttle opening angle "θTH" is an amount of increase of the opening angle in the present control cycle "θTH(1)", over the opening angle in the preceding control cycle "θTH(2)". This relation is stored in the ROM of the controller 56. An example of such relation is illustrated in FIG. 4. Step SS1 is followed by steps SS2 and SS3 to check if the determined increase rate "ė" is larger than predetermined values "B" and "A", respectively. The predetermined value "B" is used for judging whether the increase rate "ė" is excessively large or not, whereas the predetermined value "A", which is smaller than "B", is used for checking whether the increase rate "e" falls within a range between "A" and "B". If the increase rate "ė" is found in step SS2 to be larger than "B", that is, if the speed ratio "e" should be increased rapidly, the controller 56 goes to step SS4 to maximize the second pressure-control value "V2", thereby bringing the second pressure control servo valve 50 into its fully closed position. In this position, the relief flow of the fluid through the second pressure control servo valve 50 is zeroed. Therefore, the second line pressure Pl2 is rapidly increased, causing a similar rapid increase in the speed ratio "e" of the CVT 16. In the case where the checking in step SS3 reveals that the increase rate "ė" is smaller than the value "A", the speed ratio "e" should be increased at a low rate. In this case, step SS3 is followed by step SS5 to check if the first line pressure Pl1 is higher than the pressure "Pc" in the input-side hydraulic cylinder 34. If so, the controller 56 executes step SS6 to zero the second pressure-control value "V2" and fully open the second pressure-control servo valve 50, thereby rendering the second line pressure Pl2 equal to the first line pressure Pl1. In this condition, the fluid in the second pressure line 46 may flow into the input-side hydraulic cylinder 34 because the second line pressure Pl2 now equal to the first line pressure Pl1, is higher than the pressure "Pc" in the input-side cylinder 34. If the first line pressure Pl1 is found in step SS5 to be lower than or equal to the pressure "Pc", step SS7 is executed to set the second pressure-control value "V2" to a comparatively small value "α", the minimum value required to increase the speed ratio "e" at a relatively low rate. When the speed ratio "e" is increased at a relatively low rate, the second pressure control servo valve 50 is controlled so that the second line pressure Pl2 is equal to or slightly higher than the first line pressure Pl1, thus minimizing the power loss in the drive for the oil pump 44.

Figure 5:
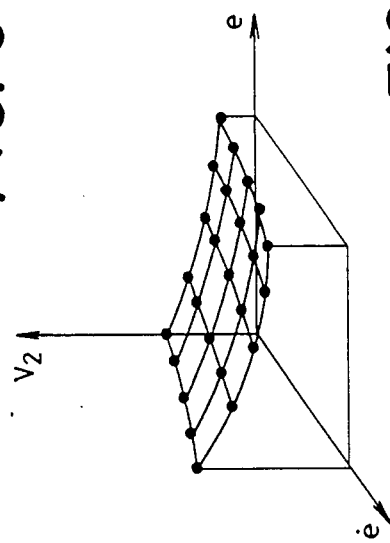
FIGS. 4 and 5 are illustrations showing predetermined relations used in steps SS1 and SS8 of the flow chart of FIG. 3, respectively.

When steps SS2 and SS3 reveal that the increase rate "ė" is smaller than "B" but larger than "A", the controller goes to step SS8 wherein the second pressure-control value "V2" is determined so that speed ratio "e" is increased at a varying medium rate. This determination is based on the speed ratio "e" and the increase rate "ė", according to the predetermined relation indicated in FIG. 5. Specifically, the pressure differential "ΔP" between the first and second line pressures Pl1 and Pl2 is increased, thereby increasing the increase rate "ė" and decreasing the speed ratio "e". In this embodiment, the speed ratio "e" may be increased at the required increase rate "ė" without an excessive increase in the second line pressure Pl2, and without dependence of the increase rate "ė" upon the actual speed ratio "e".

Figure 7:
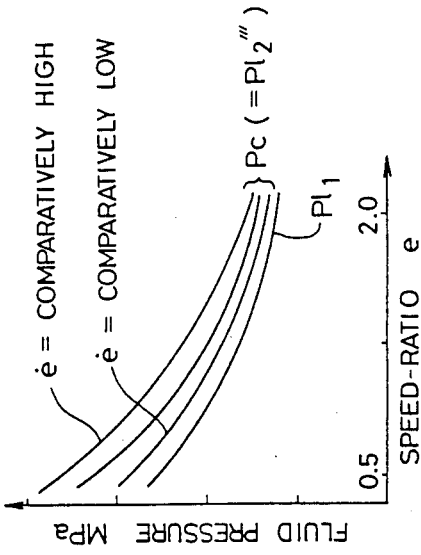
FIGS. 6 and 7 are graphical representations of changes in pressure at different points in the hydraulic circuit, in relation to a speed ratio of the transmission.
Figure 6:
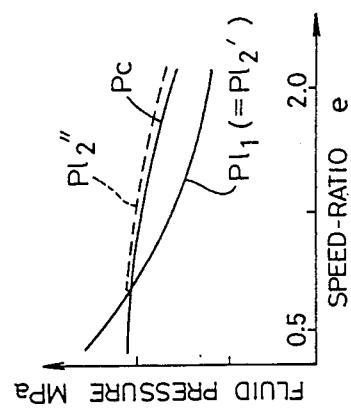

The preferred embodiment maintains the second line pressure Pl2 at the same level as the first line pressure Pl1, as indicated at Pl2' in FIG. 6, while the speed ratio "e" of the CVT 16 is constant or reduced. This occurs when the actual input speed "Nin" of the input shaft 18 of engine 10 is equal to the target input speed "Nin*", or when the input speed "Nin" is lower than the target input speed "Nin*" and should therefore be raised to the target input speed "Nin*". If the pressure "Pc" in the input-side cylinder 34 is lower than the first line pressure Pl1, then the second line pressure Pl2 is maintained at the first line pressure Pl1 while the speed ratio "e" is increase at a comparatively low rate. When the increase rate "ė" is comparatively low and the first line pressure Pl1 is lower than or equal to the pressure "Pc" in the input-side at the predetermined small value "α", so that the second line pressure Pl2 is maintained at a minimum level necessary to attain a slow increase in the speed ratio "e", as indicated at Pl2" in FIG. 6. In other words, the second line pressure Pl2" is maintained at a slightly higher level than the pressure "Pc". When the speed ratio "e" is increased at a normal rate, the second pressure-control value "V2" is determined in step SS8 to hold the second line pressure Pl2 at a minimum level required to achieve the low speed ratio increase rate "ė". In this case, the second pressure-control value "V2" and the speed ratio "e" are increased in order to avoid the dependence of the increase rate "ė" upon the speed ratio "e". Thus, the second line pressure Pl2 is varied relative to the speed ratio "e" and the increase rate "ė", as indicated at Pl2'''' in FIG. 7. Therefore, the speed ratio "e" can be increased while keeping the second line pressure Pl2 at a minimum level without the dependence of the increase rate "ė" upon the speed ratio "e", thereby improving the drivability of the vehicle.

As described hitherto, the illustrated hydraulic control system for the CVT 16 is arranged to maintain the second line pressure Pl2 at a necessary minimum which is determined according to the predetermined conditions. Consequently, the power consumed by developing the hydraulic pressure for the CVT 16 is minimized and the fuel economy of the vehicle is accordingly improved. Further, the drivability of the vehicle is improved, since the second line pressure Pl2 is determined such that the rate of "ė" is independent of the speed ratio "e".

It is obvious that other changes, modifications and improvements may be made in the invention without departing from the spirit and scope of the invention defined in the appended claims.

What is claimed is:

1. A hydraulic control system for a continuously variable transmission which has a variable diameter input pulley and a variable diameter output pulley provided on an input and an output shaft, respectively, with a transmission belt connecting the input and output pulleys allowing transmission of power from the input pulley to the output pulley; a pair of hydraulic cylinders for changing the effective diameters of the pulleys engaging the belt; a hydraulic source to supply a pressurized fluid to one and the other of the hydraulic cylinders via a first and a second pressure line, respectively, said hydraulic control system comprising:

a first pressure regulating device, connected to said first pressure line, for regulating said first line pressure to be applied to said one hydraulic cylinder, and thereby controlling a tension of said transmission belt;

a flow control device, disposed in said second pressure line, for controlling a flow of pressurized fluid from said second pressure line into said other hydraulic cylinder and a flow of the fluid to be discharged from said other hydraulic cylinder, thereby controlling a speed ratio of said transmission such that said speed ratio is reduced by discharging the fluid from said other hydraulic cylinder;

a second pressure regulating device, disposed between said hydraulic source and said first pressure regulating device, for controlling a rate of relief flow of the fluid there-through from said second pressure line toward said first pressure regulating device, thereby regulating said second line pressure which is higher than said first line pressure, such that a pressure differential between said first and second line pressures is inversely proportional to said rate of relief flow of the fluid; and a control device for controlling said second pressure regulating device to regulate said second line pressure said control device being operable to maximize said rate of relief flow of the fluid through said second pressure regulating device, so as to zero said pressure differential to permit said second line pressure to be equal to said first line pressure while said speed ratio of said transmission is constant or reduced.

2. A hydraulic control system according to claim 1, wherein said control device controls said rate of relief flow to control said pressure differential based on a rate of increase in said speed ratio.

3. A hydraulic control system according to claim 2, wherein said control device controls said rate of relief flow of the fluid through said second pressure regulating device, by increasing said pressure differential while decreasing said speed ratio, or by increasing said rate of increase in the speed ratio within a predetermined normal range.

4. A hydraulic control system according to claim 2, wherein while said rate of increase in said speed ratio is lower than a predetermined level, said control device maximize said rate of relief flow of the fluid through said second pressure regulating device, so as to zero said pressure differential when said first line pressure is higher than the pressure in said the other hydraulic cylinder, and so as to set said pressure differential at a predetermined minimum value required to attain said rate of increase in said speed ratio when said first line pressure is lower than or equal to the pressure in said the other hydraulic cylinder.

5. A hydraulic control system according to claim 2, wherein said control device minimizes said rate of relief flow of the fluid through said second pressure regulating device, so as to maximize said pressure differential while said rate of increase in the speed ratio is higher than a predetermined level.

6. A hydraulic control system for a continuously variable transmission which has a variable diameter input pulley and a variable diameter output pulley provided on an input and an output shaft, respectively, with a transmission belt connecting the input and output pulleys allowing transmission of power from the input pulley to the output pulley; a pair of hydraulic cylinders for changing the effective diameters of the pulleys engaging the belt, said pair of hydraulic cylinders having substantially the same pressure-receiving areas; a hydraulic source to supply a pressurized fluid to one and the other of the hydraulic cylinders via a first and a second pressure line, respectively, said hydraulic control system comprising:

a first pressure regulating device, connected to said first pressure line, for regulating said first line pressure to be applied to said one hydraulic cylinder, and thereby controlling a tension of said transmission belt;

a flow control device, disposed in said second pressure line, for controlling a flow of pressurized fluid from said second pressure line into said other hydraulic cylinder and a flow of the fluid to be discharged from said other hydraulic cylinder, thereby controlling a speed ratio of said transmission such that said speed ratio is reduced by discharging the fluid from said other hydraulic cylinder;

a second pressure regulating device, disposed between said hydraulic source and said first pressure regulating device, for controlling a rate of relief flow of the fluid there-through from said second pressure line toward said first pressure regulating device, thereby regulating said second line pressure which is higher than said first line pressure, such that a pressure differential between said first and second line pressures is inversely proportional to said rate of relief flow of the fluid; and a control device for controlling said second pressure regulating device to regulate said second line pressure, said control device being operable to maximize said rate of relief flow of the fluid through said second pressure regulating device, so as to zero said pressure differential to permit said second line pressure to be equal to said first line pressure while said speed ratio of said transmission is constant or reduced, said control device controlling said rate of relief flow to control said pressure differential based on a rate of increase in said speed ratio.

* * * * *